United States Patent
Lakunishok

(10) Patent No.: US 12,504,192 B2
(45) Date of Patent: Dec. 23, 2025

(54) PREDICTIVE BUILDING AIR FLOW MANAGEMENT FOR INDOOR COMFORT THERMAL ENERGY STORAGE WITH GRID ENABLED BUILDINGS

(71) Applicant: LAKEN AND ASSOCIATES INC., Thornhill (CA)

(72) Inventor: Jack Lakunishok, Thornhill (CA)

(*) Notice: Subject to any disclaimer, the term of this patent is extended or adjusted under 35 U.S.C. 154(b) by 198 days.

(21) Appl. No.: 17/581,567

(22) Filed: Jan. 21, 2022

(65) Prior Publication Data
US 2023/0235908 A1 Jul. 27, 2023

(51) Int. Cl.
*F24F 11/46* (2018.01)
*F24F 5/00* (2006.01)
*F24F 11/63* (2018.01)
*F24F 11/875* (2018.01)
*F24F 110/12* (2018.01)
*F24F 110/70* (2018.01)
*F24F 130/10* (2018.01)
*F24F 140/60* (2018.01)

(52) U.S. Cl.
CPC ............ *F24F 11/46* (2018.01); *F24F 5/0046* (2013.01); *F24F 11/63* (2018.01); *F24F 11/875* (2018.01); *F24F 2005/006* (2013.01); *F24F 2110/12* (2018.01); *F24F 2110/70* (2018.01); *F24F 2130/10* (2018.01); *F24F 2140/60* (2018.01)

(58) Field of Classification Search
CPC .................................................. F24F 11/875
See application file for complete search history.

(56) References Cited

U.S. PATENT DOCUMENTS

| | | | |
|---|---|---|---|
| 4,124,062 A | 11/1978 | Andersson et al. | |
| 4,830,275 A | 5/1989 | Andersson | |
| 7,588,037 B1* | 9/2009 | Ratliff | B01F 25/45241 |
| | | | 134/22.1 |
| 10,619,881 B2* | 4/2020 | Hunka | F24F 11/63 |
| 11,092,977 B1* | 8/2021 | Coleman | G02B 3/12 |
| 2006/0004492 A1* | 1/2006 | Terlson | F24F 11/30 |
| | | | 700/276 |
| 2008/0142610 A1* | 6/2008 | Bastow | F24D 5/10 |
| | | | 237/69 |
| 2011/0204720 A1* | 8/2011 | Ruiz | B60L 53/305 |
| | | | 307/66 |
| 2011/0272117 A1* | 11/2011 | Hamstra | F24T 10/10 |
| | | | 165/185 |

(Continued)

OTHER PUBLICATIONS

Hasnat Jamil, Morshed Alam and Jay Sanjayan, Thermal Performance of Hollow-Core Slab Ventilation System with Macro-Encapsulated Phase-Change Materials in Supply Air Duct, Published Feb. 22, 2019 (Year: 2019).*

*Primary Examiner* — Nathan L Laughlin
(74) *Attorney, Agent, or Firm* — Eugene Gierczak; Gardiner Roberts LLP

(57) ABSTRACT

A thermal energy exchange and ventilated hollow core slab system and method within a building where the slab has an air passage with an inlet and outlet, an air handler unit having adjustable heating/cooling structure and, and ventilation structure connected to the hollow core concrete slab, and a building control connected to the hollow core concrete slab and air handler system for relative thermal exchange between the air and hollow core concrete slab to control user comfort; where the building is grid enabled.

18 Claims, 6 Drawing Sheets

DETAIL A

DETAIL B

DETAIL C

(56) References Cited

U.S. PATENT DOCUMENTS

| | | | | |
|---|---|---|---|---|
| 2014/0365017 | A1* | 12/2014 | Hanna | F24F 11/65 |
| | | | | 700/276 |
| 2015/0129163 | A1* | 5/2015 | Schonhorst | F24D 5/10 |
| | | | | 165/49 |
| 2020/0217523 | A1* | 7/2020 | North | F24F 13/20 |
| 2021/0325069 | A1* | 10/2021 | Cotton | B60L 53/30 |
| 2021/0356153 | A1* | 11/2021 | Nesler | F24F 11/46 |
| 2022/0381467 | A1* | 12/2022 | Nakamura | F24F 11/64 |

\* cited by examiner

PREDICTIVE BUILDING AIR FLOW MANAGEMENT FOR INDOOR COMFORT THERMAL ENERGY STORAGE WITH GRID ENABLED BUILDINGS

FIELD OF INVENTION

This invention relates to a thermal energy exchange and ventilated hollow core slab system and method within a building, where the slab has an air passage with an inlet and outlet; an air handler unit having adjustable heating/cooling structure and ventilation structure, connected to the hollow core concrete slab; and a building control connected to the hollow core concrete slab and air handler unit to control relative thermal exchange between the air and hollow core concrete slab to control user comfort; where the building as a year-round thermal energy storage is electrically grid enabled.

HVAC SYSTEM INTEGRATED WITH BUILDING CONCRETE FLOORS

This invention enables historically passive concrete floors as actively managed Thermal Energy Storage (TES) asset resulting from ventilation system exchange via connected voids in hollow core concrete floors, outdoor air and supporting heating/cooling systems. The method driven by TES includes a combination of year-round space comfort (heating or cooling) conditioning using ventilation air delivered through a hollow core concrete medium on demand.

BACKGROUND TO THE INVENTION

Many prior art devices and methods have heretofore been designed as standalone heating, ventilating and air conditioning (HVAC) systems.

Some of the HVAC systems have been designed for various standalone HVAC systems. Other HVAC systems have been designed for hollow core slab systems. Hollow core/slab integrated ventilation air conditioning and thermal energy technology and applications are also well known and widely used in Scandinavian countries. For example, U.S. Pat. No. 4,124,062 relates to a system of passing controlled air from outside a building through channels in a concrete floor so as to cool the concrete thereby storing the coolness which is then transferred to the room in the following day. Furthermore U.S. Pat. No. 4,830,275 relates to temperature control of buildings having prefabricated hollow concrete slabs or concrete floor structures with cast in ducts where cooled supply air flows through the floor structure before it is supplied by way of supply air device to the room unit on the floor.

Differentiation with Existing Technologies:

Existing Technologies in summer mode today typically use ice as it was used during George Washington times to maintain cooler indoors in the White house. More recent developments offer add on Compressed Air machines or Water Thermal Energy Storage. The invention to be described herein uses the "dormant asset" of the concrete floor or HCS found in many buildings as a "smart asset" forming part of the building linked to building controls system and customized algorithms without the need for updates after the building is operational. They manage in advance cooling/heating during off-peak operational period including buildings functioning 24/7 in reducing year-round daytime needs when demand for energy is very high.

With Thermal Energy Storage (TES) the energy exchange dynamics are subject to change (e.g., due to local climate globally and effects on stand alone buildings facing the East-West-North-South structures or internal area issues.) Recognizing this gives opportunities to optimize year-round heating/cooling needs along with humidity and indoor air quality for cold, hot or hot and humid climates.

Integration of ventilated concrete slab with Heating/Cooling equipment leverages concrete capacity to function in dynamic mode and eliminates the need for increased daily cooling or heating than necessary to maintain comfort conditions.

Heating or cooling capacity of the slab when charged is a floating interaction of a great number of factors. These factors relate not only to the room configuration but also to supply air conditions and quantity in specific climate zones. Re-chargeable thermally active systems such as TES, should not be compared to conventional system (that crudely inject energy into the system) directly in binary "On" or "Off" mode.

One feature of the technology to be described relates to technology for Net-Zero Carbon Buildings with year-round summer and winter activation of historically passive concrete as an active thermal energy storage responding to outside weather fluctuations and indoor user adjustable temperate 58 conditions with aim to maintain user adjustable indoor comfort in any climate to suit their preferences. Its incidental solar radiation (light) and use of the building by human movement within it. This change determined on the use of the building, the environment and the time of day/night. It is possible to harness the airflow that carries low grade valuable energy or intentionally injected heating or cooling by in-floor labyrinth supported by custom software and mechanical engineering of low energy fans to both store excess energy when available, for cooling and/or heating and delayed discharge on demand. The invention to be described relates to the development of custom software outputs to facilitate this solution designs as the Thermal Building as a Battery (TES). The control of the facilities of the TES would be via a Building Intelligent Controls Cockpit System (BIC) 42.

It is an object of this invention to provide an improved system and method. It is another object of this invention to provide a system and method for use in a year-round grid enabled building.

It is also an object of this invention to provide an improved thermal energy exchange using ventilating system in multi-tasking mode with newly enabled thermal Energy Grid Enabled Buildings (GEB's).

It is another object of this invention to deliver advanced Integrated HVAC with a building structure as a "smart" asset set to connect this type of Sustainable Buildings with Smart City energy grid. This type of building structure integration with indoor comfort systems leads to reduced embodied and operational carbon, optimizes occupant thermal comfort and indoor air quality (health and safety) while cutting energy use. This integrated HVAC system connects with buildings ventilated floor system set to control the indoor comfort using air flow within buildings ventilated structure. Efficient control of indoor comfort, air quality by leveraging thermally charged concrete characteristics reduces need for excessive daily cooling and/or heating.

It is a further object of this invention to provide a meaningful interplay of electrical energy within Grid Enabled Buildings (GEB's) for connection with "smart" City energy grid to ease infrastructures growing electrification trends. The goal being to allow Net Zero Building Energy use building energy profiles optimize for interplay with Smart City energy grid empowered buildings and virtually expand existing energy grid capacity.

It is an aspect of this invention to provide a thermal energy exchange and ventilated hollow core medium where the hollow core medium has an air passage there through with an inlet and outlet communicating with the air passage; and an air handler unit having an adjustable heating/cooling structure and ventilation structure connected to the hollow core medium to deliver air from the outlet of the hollow core medium to a space exterior to the hollow core medium. It has been found that the required heating and cooling capacity of the air handling unit to maintain year-round indoor comfort is considerably smaller than what conventional software predicts.

In one embodiment of the invention the thermal energy exchange and ventilated hollow core medium system comprises a hollow core concrete slab of a floor or ceiling, and the air passage comprises a plurality of voids connected together to define an air passage labyrinth presenting the inlet and the outlet. In another embodiment the outlet comprises a floor mounted diffuser or a ceiling mounted diffuser. In yet another embodiment the air handler unit includes a fan for blowing air through the air passage labyrinth for relative thermal exchange between the air and the hollow core concrete slab. The air is delivered through the floor mounted diffuser to a space above the hollow core concrete slab. The air handler unit also includes adjustable heating and cooling structure for delivering the air to the inlet, through the labyrinth and out the open-air outlet to a space above the hollow core concrete slab. The system can include a return air duct for directing the air out the space at the ceiling or floor.

It is another aspect of this invention where the thermal energy exchange and ventilated hollow core concrete slab system includes a thermostat and a rapid boost motorized damper to optionally select one of the multiple voids so as to shorten said labyrinth passage to increase the heating or cooling exchange with the space. The hollow core concrete slab is disposed in both a ceiling and floor of a building so as to define a space there between and includes an adjustable comfort setting unit for one room or one floor zone in the building. In one embodiment an upper opening is presented at on one end of the hollow core concrete slab for receiving a portion of air in the space; and another opening at another end of the hollow core concrete slab for delivering air in the space. The system includes temperature sensors, humidity and CO2 sensors for indoor air quality control. The system built in resistance is capable of functioning during occupied hours with ventilation alone for 4 hours or more and is connected to an electrical grid so as to provide a Grid Enabled Building.

It is another aspect of the invention to provide a grid enabled building comprising: (a) a hollow core concrete slab disposed in a ceiling and floor of the building to define a space there between; the hollow core concrete slab extending longitudinally from one end of said hollow core concrete slab to another end and presenting a plurality of substantially parallel hollow cores extending inside said hollow core concrete slab from said one end to said other end; wherein some of the substantially hollow cores are plugged at said ends and bridged to present a labyrinth passage having an inlet and outlet on the other end of the labyrinth; (b) an air handler unit comprising: (i) adjustable heating/cooling structure; and (ii) ventilation structure, connected to the hollow core concrete slab to deliver air from said outlet to said space; and (c) building control structure comprising sensors to sense selected parameters affecting air quality or condition and activate the air handler unit. In one embodiment the grid enabled building includes an enabling digital switch to connect the grid enabled building to a Smart City Energy Grid via internet. In one embodiment of the invention the building control structure includes a control capable of being activated to collect and store thermal energy in the hollow core concrete slab when in a heating mode for delayed discharge on demand when needed. In another embodiment of the invention the building control structure includes a control capable of being activated to collect and store thermal energy in the hollow core concrete slab when in a cooling mode for delayed discharge on demand when needed. In another embodiment the building control structure includes software for data gathering of energy consumption of the building so as to reduce the need for typically larger specified HVAC heating/cooling capacity. The building control structure controls vertical temperature rise in a multi-story building by individual HVAC units located on each floor of a building. The building control structure is operable to set to identify via controls logic breach of building envelope in thermally charged building to reduce loss of heating or cooling, maintain desired space comfort, save energy and cut carbon emission.

In a further embodiment the building control means is set to collect and store within the hollow core concrete section thermal heat energy from the underground sewer lines and store it within the building.

In yet another embodiment the grid enabled building is connected to in multi-buildings and set to interact between the multi-buildings to control indoor radiant comfort using air only.

It is another aspect of the invention where the software is operable based on a sequence of restrictions on the possible sources of heating, cooling, humidity and economizer cycles for various heating cooling zones globally; wherein the restrictions are relaxed with each time step in the building until desired indoor conditions are met by actively utilizing building dynamics with high potential of peak power reduction management without comfort compromise; and wherein effective indoor climate control can be achieved by prompting compensations with advanced smoothing and forecasting to considerably lower the need for heating or cooling capacity by using energy stored in said grid enabled building during off-peak (night time) charging and avoiding day time peak periods until necessary.

It is another aspect of the invention that the building controls are integrated with the hollow core concrete slabs to actively store thermal energy for harnessing free energy from exterior assets to recalibrate need for supplementary heating or cooling; wherein a supply air variable set-point temperature to each building zone is continuously re-calculated on a floating basis, such that adjustments to the supply air temperature differential between the hollow core concrete slab, exhaust air temperature and set-point, initially set by user or building operator, and the actual average extract (exhaust) or return air temperature from the outlet, as measured before the recirculation loop; wherein in case of dX system cooling will be triggered when return or average zone or the highest temperature requires compensation to maintaining the desired comfort setting; and wherein supply air temperature adjustment shall be=T.E.S. using a variable compensation algorithm FACTOR for the building in a respective climate zone and time of the year.

Another aspect of this invention resides in the grid enabled building wherein the reset variable set-point is machine learnable and is re-calibrated based on comparison of simulated versus actually constructed building for the climate zone the building is built; wherein the output from the building control system includes recommendations and itemized guide for necessary corrective maintenance in event of greater divergences from acceptable variances; and wherein the output is delivered to an algorithm of the software to minimize, mitigate the problem, plus delivering a report to repair or rectify specific components.

Another aspect of this invention resides in a method to control the thermal energy exchange and ventilation of a building comprising: (a) providing hollow core concrete slabs in floors of said building; said hollow core concrete slabs having a passage there through with an inlet and outlet and defining a space between the floors; (b) connecting an air handler unit to the hollow core concrete section so as to deliver air to the inlet through the passage for relative thermal energy exchange between the air and the hollow core concrete slab and out the outlet to a space above a floor; (c) connecting a building control unit to the air handler unit and the hollow core concrete slab; the building control unit comprising software algorithms, sensors to sense selected parameters affecting air quality or condition including outside weather fluctuations, indoor temperature, incident solar radiation, use of human movement within the space, time of day, and activate the air handler unit so as to maintain user adjustable indoor comfort; (d) harnessing the thermal energy exchange to store excess thermal energy until needed for cooling and heating; (e) discharging the stored excess thermal energy to said air when needed so as to maintain user adjustable indoor comfort.

It is the aspect of this invention to provide year-round thermal energy exchange and ventilation system comprising a hollow core concrete floor as a multi-tasking floor kit having an air passage there through with an inlet and open-air outlet for receiving air and permitting relative thermal exchange there between communicating with said outlet so as to receive air from said air passage through said hollow core concrete floor. This type of system supports grid enabled buildings which will have built in capability for new low carbon buildings and reduction in growing operational expenses. Electrically Grid-interactive efficient buildings with built in life cycle non-disposable buildings thermal storage capabilities are set to not only modify volume and time of energy use, but also to integrate onsite compact renewable energy generation, monitored and managed via smart controls, to become a resilient Smart City asset with more reliable energy grid acting in sync with changing needs. Year-round thermal storage addresses immediate needs for low carbon buildings transition to all electrically powered building trend to eliminate gas or fossils heating. Geothermal compact systems interplay with the system described herein compared to larger ones would facilitate them as the most attractive environmental and business solution in gaining greater market traction.

These and other aspects and features of the invention shall now be describes having reference to the following drawings.

DETAILED DESCRIPTION OF THE INVENTION

Figure 1:
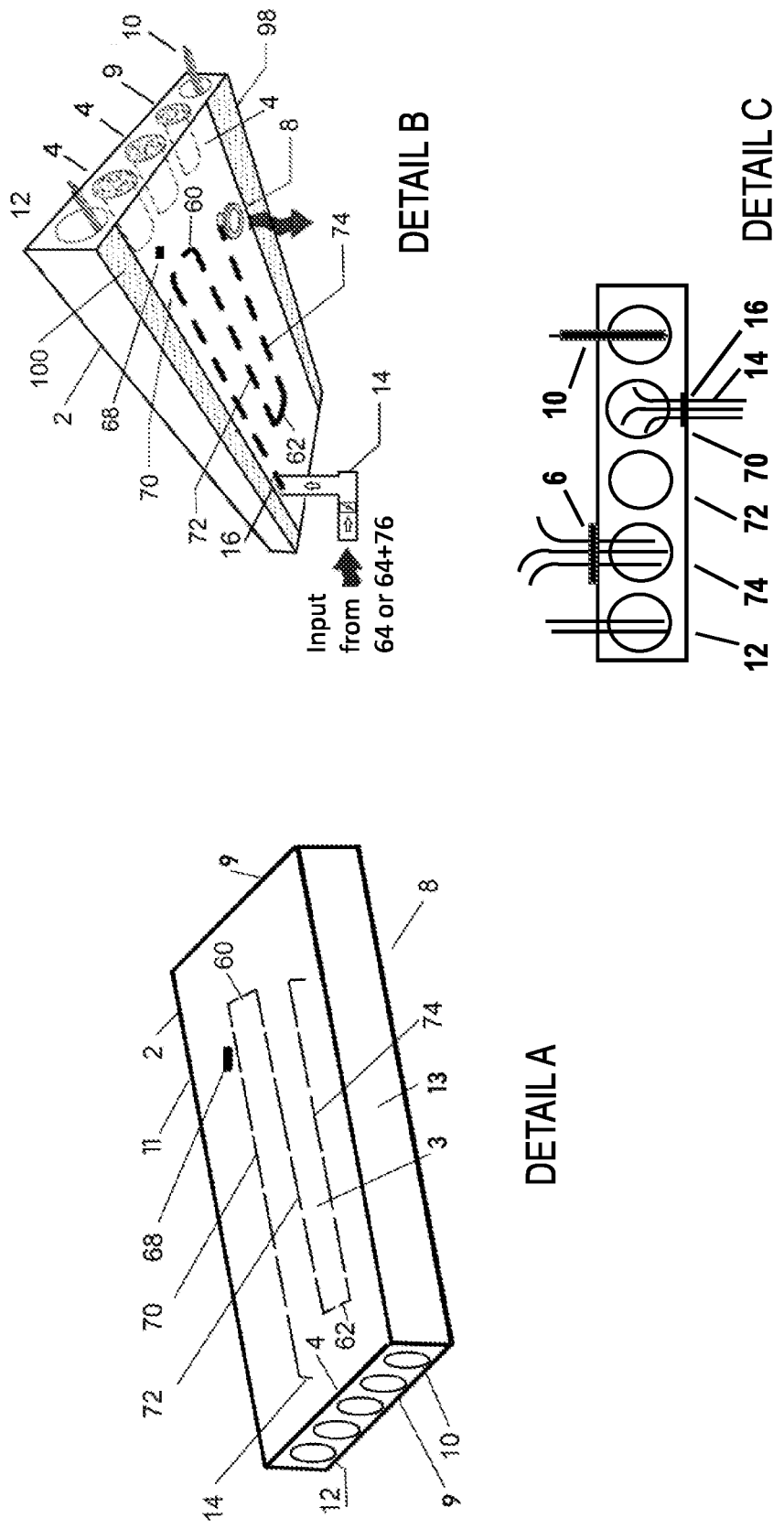
FIG. 1 illustrates the Smart Floor Kit or hollow core concrete slab to be described.

In the description which follows, like parts are numbered throughout the descriptions with supporting diagrams and drawings with respective reference numerals. The drawings are not necessarily to scale and, in some instances, proportions may have been exaggerated in order to more clearly illustrate certain features of the invention.

FIG. 1 generally illustrates the conversion or modification of standard hollow core slabs or cast in place concrete or tilt up method of concrete floor construction into an active or thermally chargeable hollow core, slab or concrete floor medium having at least one air passageway there through.

One of the most commonly used hollow cores comprise a hollow core concrete floor slab that is used in buildings. The hollow core concrete floor slab as described in this invention is comprised of concrete having a plurality of generally parallel hollow cores or voids 70, 72 and 74 used for ventilation, heating and cooling. During the conversion the hollow cores 70, 72 and 74 are linked as shown to produce air cross overs or bridges 60 and 62 so as to provide a passage or labyrinth 3 that connects three cores 70, 72, and 74 within the hollow core concrete floor slab 2 that includes an air inlet 14 and terminating in open air ceiling mounted outlet 8 or floor mounted outlet 6. The air bridges 60 and 62 link the cores 70, 72, and 74.

More particularly FIG. 1 shows a depiction of a standard hollow core slab 2 (HCS) modified or converted into a smart floor unit with an interior labyrinth 3 that connects three voids 70, 72 and 74 into one long air loop or labyrinth 3 in the concrete floor.

This invention exploits the thermal properties of industry standard hollow core slab 2 utilizing the dormant voids that combines three voids 70, 72 and 74 into one long air loop 3 for use as a ventilation, heating or cooling delivery system as well as year-round thermal storage into one multi-tasking system. The hollow core concrete slab 2 open ends 7 and 9 are sealed solid with custom plugs 4 on both ends 7 and 9 of now active 3 voids 70, 72 and 74 forming one long air loop or passageway 3. Cross overs 60 and 62 link three hollow core voids 70, 72 and 74 into one long labyrinth or air loop 3. For example a typical 10" inch thick hollow core slabs 2 consist of five voids where three 70, 72 and 74 out of the five voids are used for air delivery system and two outer areas 98 and 100 uses voids 10 and 12 for electrical power or hard-wired data or security cables. A typical slab 2 is generally rectangular in top plan view having spaced ends 7 and 9 with spaced sides 11 and 13. In-slab temperature sensors 68 are strategically placed to measure the thermal status of the slabs 2. However slabs having any number of parallel voids can also be used.

Openings can be placed on the exterior surface of the slab 2 that define air inlet 16 that communicate with the passageway or air loop 3 and provide air connection and communication with air ducts 14. In one embodiment the air ducts 14 comprise L-Shaped branch duct 14 that connect to 16 for air inlet to core 70 with ceiling mounted with ceiling mounted air outlet opening 8 shown in detail B of FIG. 1 or floor mounted air outlet 6 shown in detail C.

The invention described herein is adaptable to convert typical slabs that that only have the plurality of hollow parallel voids by modifying the typical slab 2 by adding the plugs 4 and providing for cross overs 60 and 62 or the slabs 2 can be cast in place concrete.

The slabs 2 as described herein can also be produced in a number of ways including on site tilt up construction method of concrete floor or hollow core concrete floor having an air passage labyrinth 3 comprising voids 70, 72, and 74 inside of the floor with an inlet and open air floor mounted outlet 6 or ceiling mounted air outlet 8 for receiving air into space and permitting interactive thermal radiant energy exchange combined with ventilation.

The linking of three voids 70, 72 and 74 into one long circuitous path combines laminar and turbulent air flows for active thermal exchange and thermal energy storage in the mass of the slab 2. This configuration is set to harnesses indoor or outdoor energy ranging from low grade to allowable maximum in building applications.

Part Plan of In-slab Air Distribution and Control

Figure 2:
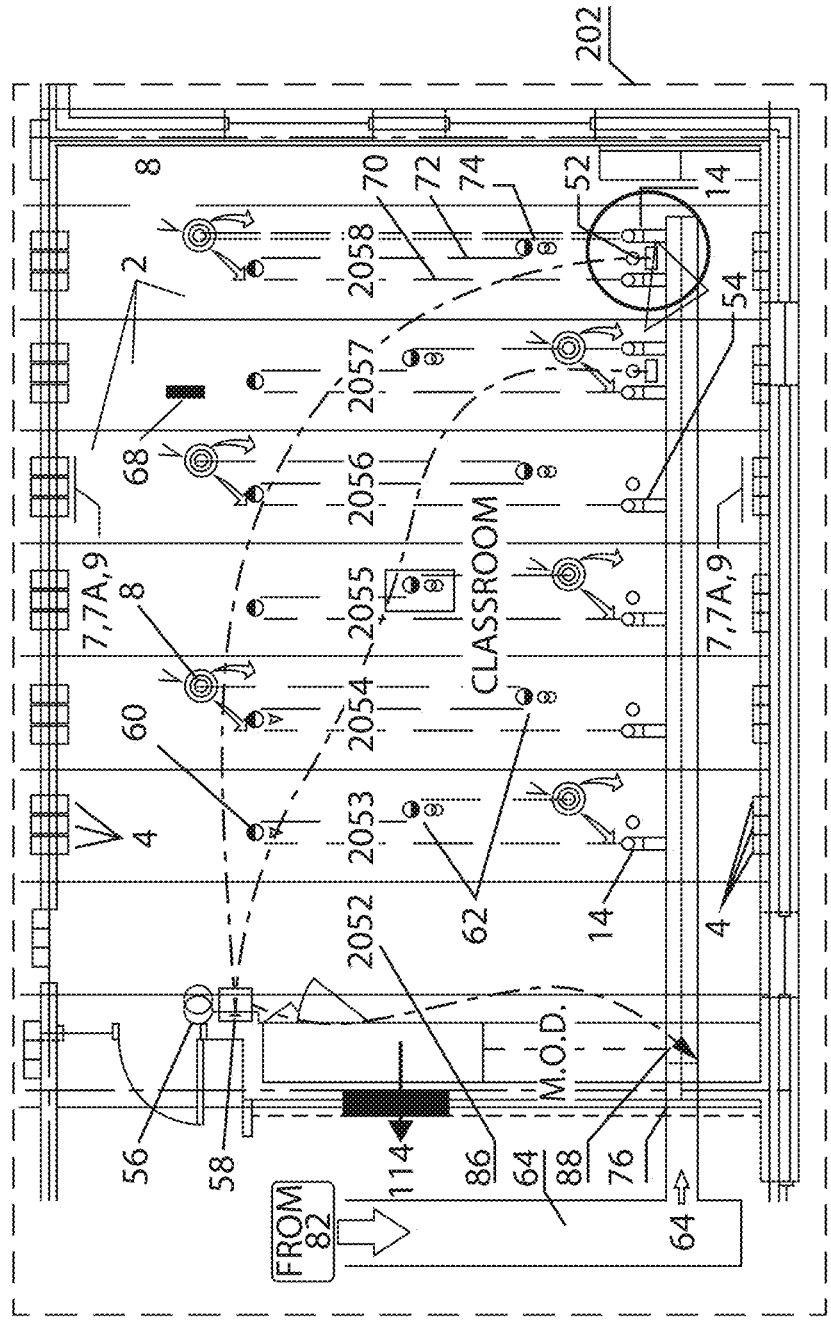
FIG. 2 is a top part art plan illustrating Constant Space Temperature design with Rapid boost Cooling or Heating Option.

FIG. 2 shows an example of a space top part plan view 202 in a building served from air handling means or structure. In one embodiment the air handling means or structure comprise mechanical or service room 82 having heat pump assembly shown in FIG. 3. In another embodiment the air handling means comprises an air handling unit (AHU) assembly in service room 84 shown on FIG. 4. The part plan view shows the room air supply from duct 64 fed into sub-duct 76 controlled by motorized damper 88 for connection to a number of L-shaped branch ducts 14 into the voids 70, 72 and 74 of the individual slabs or planks 2 having return air damper assembly 114.

More specifically FIG. 2 shows a plurality of slabs or planks 2 marked as 2052, 2053, 2054, 2055, 2056, 2057, and 2058 disposed in adjacent side by side fashion, where the side 11 of one slab 2 contacts the side 13 of the next adjacent slab 2 to define a floor or ceiling. Each plank 2 can comprised either one slab 2 or a plurality of slabs 2 joined in end to end fashion where the end 7 of one slab 2 contacts the end 9 of the adjacent slab 2.

Figure 3:
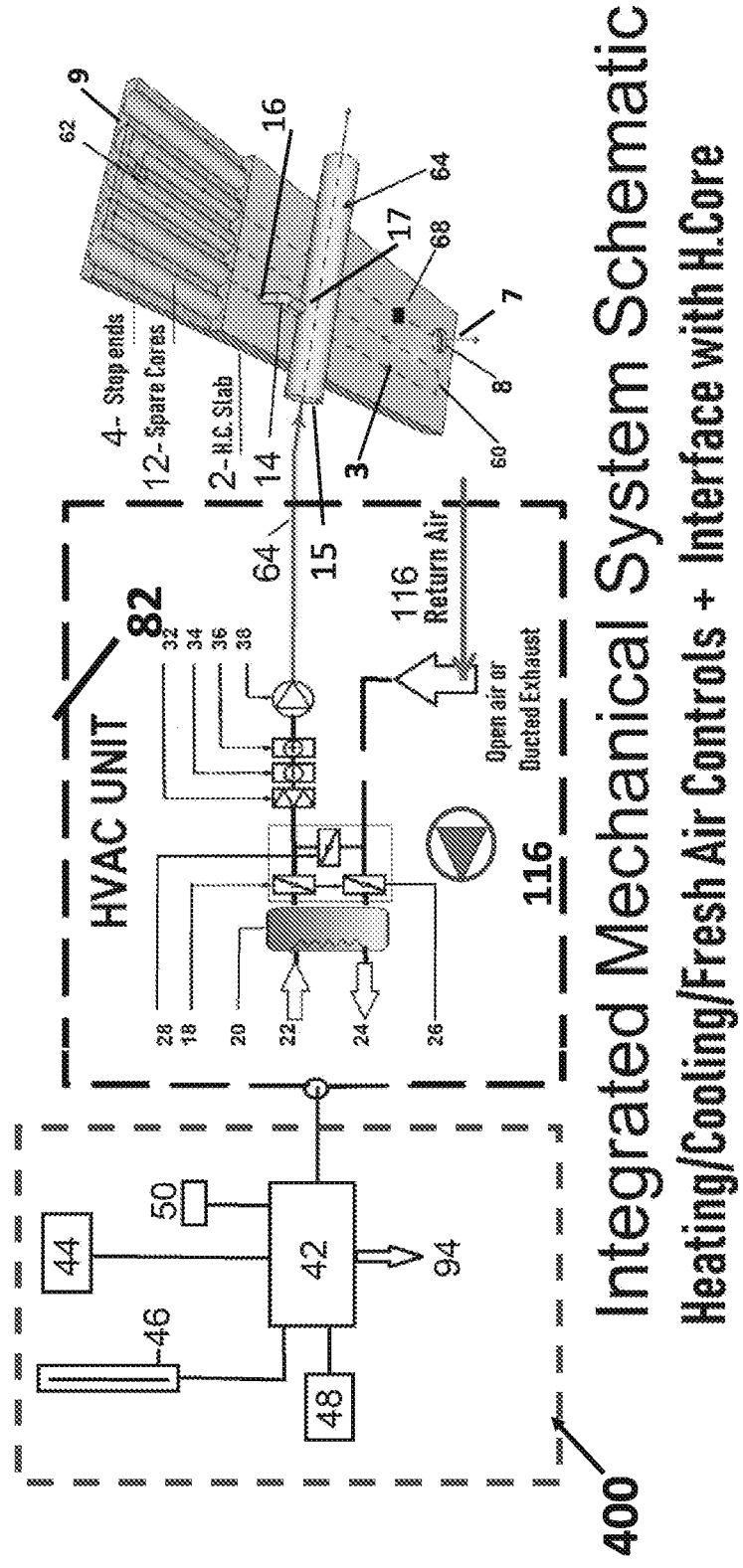
FIG. 3 illustrates an integrated mechanical system set for Smart City Integration with Energy Grid via Buildings Intelligent Controls (BIC).
Figure 4:
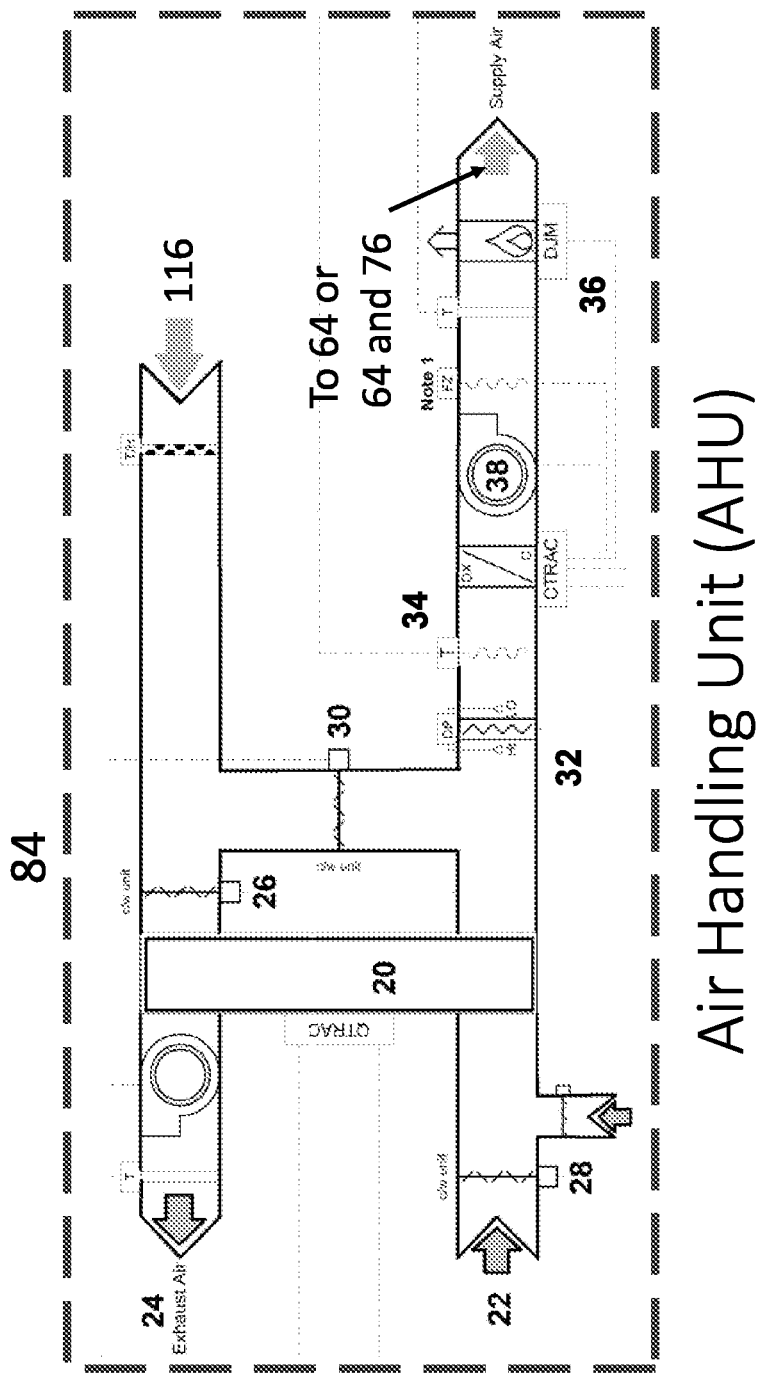
FIG. 4 illustrates integrated Air Handling Unit (AHU) system.

The supply air fan 38 shown for Heat Pump unit shown in FIG. 3 and the air handling unit (AHU) shown in FIG. 4 communicates with one end 15 of at least one main duct 64 as shown in FIG. 3 and FIG. 4, connected to branch ducts 14 for each hollow core plank 2 and communicates with a number of concrete floor planks identified by numerals, 2052, 2053, 2054, 2055, 2056, 2057, and 2058.

Another end 17 of the at least one main duct 64 communicates with the inlets via L-shaped branch duct 14 of each of the slabs 2 defining the at least one hollow concrete floor slab section 2 to circulate air through the loop 3 inside voids 70, 72 and 74 of the slabs 2. The air in the slabs 2 will travel for example through three connected voids 70,72 and 74 then exit through the open-air outlet 8 in the ceiling of each of the slabs 2 shown on FIG. 1 and FIG. 2 defining at least one hollow concrete floor slab. FIG. 2 shows that a plurality of branch ducts 14 are connected to the hollow core plank numerals, 2052, 2053, 2054, 2055, 2056, 2057, and 2058.

The in-floor air plenum defined by labyrinth 3 communicates with outlets 6 or 8 so as to receive air from said air passage as shown in FIG. 1.

Adjustable heat pumps shown in FIG. 3 or Air Handling Units (AHU) shown in FIG. 4 via ducted means carried by main air supply ducts 64 are linked with the slabs or planks 2 for delivering a portion of the air from the in-floor air voids into respective floor space above the slabs 2. This method of conditioning air through the slabs or floor medium 2 supports flexible future space use and future space configurations.

The floor part plan shown in FIG. 2 can include a plurality of rooms described above with in-slab temperature sensor 68.

Building can have a number of individual rooms and spaces from small offices, to large boardrooms or open spaces with variable energy use intensity in each of the spaces. Building floor plan can be subdivided to suit varying needs at any time.

By using the invention described herein the required heating and cooling capacity of an Air Handling Unit to maintain year round indoor comfort is smaller than conventional calcuations predict.

Comfort controls (such as thermostats, humidity gauges, $CO_2$ sensors or pressure controls to control drafts) are used to provide selected in constant temperature building supported by rapid boost response to changing needs. In one embodiment the rapid boost option or response comprises using a short loop which can consist of just one void 74 shown in FIG. 1 to inject cooler energy without being absorbed by traveling through a long air loop that connects voids 70,72 and 74. Thermostat 58 and motorized damper 52 enable users to respond to user changing needs for instant control in room temperature adjustment to suit desired comfort. Both $CO_2$ sensor 56, and wall mounted thermostat 58 are connected to Building intelligent control 42 system shown in FIG. 3 and FIG. 6.

Temperature control management of prior art legacy systems generally rely on inefficient larger cooling capacity and uncomfortable air drafts against the heat gains generated in the building. Typically, these management systems consist of overhead supply air with Variable Air Volume boxes (VAV) or chilled beams (not shown) here.

Figure 5:
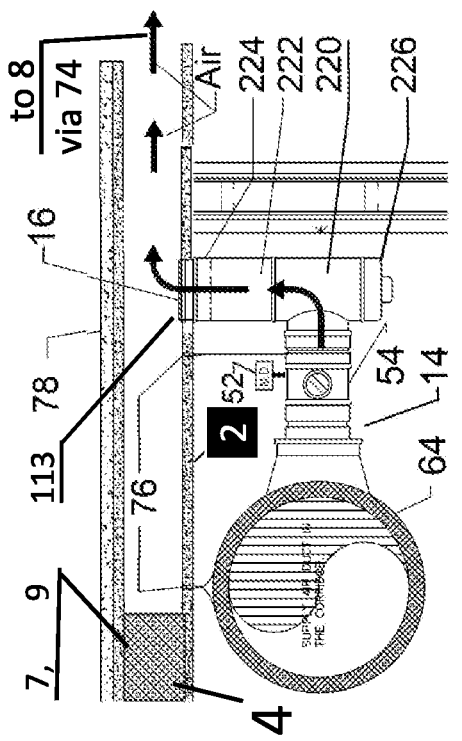
FIG. 5 illustrates the Main duct section and L-Shape branch duct connection to modified Hollow core concrete slab.
Figure 5:
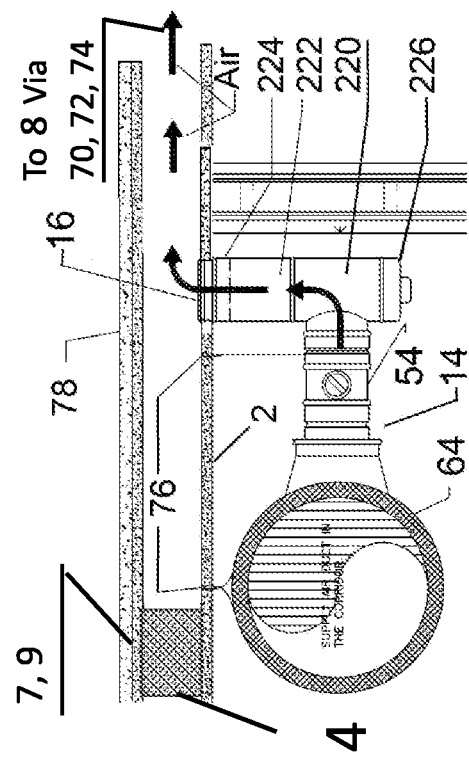

In contrast to the prior art this invention uses balancing dampers 54 and predictive motorized dampers 52 activation which are provided for in the initial set up or can be added in the future for rapid temperature adjustment to suit the space requirements. Adjustable comfort with this invention can in one embodiment be achieved by the described constant temperature system sustained at an appropriate temperature for cooling through use of the same air flows re-directed with the help of motorized dampers (MD) 52 shown in plank 2058 to balancing damper 54 and linked with thermostat 58 mounted on the wall to deliver cooler air without any energy transfer into the plank 2 of the diffusers 8. In one embodiment the location of motorized dampers (MD) 52 that activates balancing damper 54 is shown in FIG. 5.

The invention described herein incorporates features in the in-floor air labyrinth 3 that combines ventilation, radiant cooling effect and convective heat transfer absorptive capability of the hollow core slab 2 in the space either above or below the slab 2. Accordingly, temperature control can be done by adjustments to temperature and constant air volume of the air through constantly adaptable plank 2 equipped with MD and thermostat on the wall to indoor comfort needs.

In one embodiment the surface temperature of the slab above the space 202, could be kept relatively constant at for example 20° C. (68 F); while the more quickly responding airstream aspect of the invention as described herein can be used for adaptable temperature control.

Accordingly, the individual room control can in one embodiment be accomplished from the rapid boost option loop 74 in plank 205B with added motorized damper to balancing damper 54 controlled from thermostat 58 of a given branch duct such as duct 14 equipped with motorized dampers 52. The invention described herein allows for on/off damper 54 in the open position of loop 70 to be closed when boost is required to open additional L-Shaped duct 14 located in loop 74 that is normally closed. The direct air flow from loop 74 in straight line with air diffuser 13 mounted on floor outlet 6 or diffuser 15 mounted on ceiling outlet 8 will deliver cooler air of 15 deg C. that would normally go through long in-slabs loop charging of the slab and terminating at air diffuser 6 or 8 at 20 deg C. or 68 F. while maintaining the same airflow rate.

Alternatively, each floor zone or entire floor may be conditioned as one unit by main air duct 64 being delivered to the space 202 on the floor from all of the main ducts 64 or 76 delivered to the entire respective floor zone/space through room/space return air 114 back to the return air fan 116.

Integrated Mechanical Systems Schematic Enabled by Building Intelligent Controls (BIC)

FIG. 3 shows the integration of the heating, cooling, fresh air controls interfaced with the hollow core 2. An electric heat pump system is shown in FIG. 3 as numeral 82 which uses generic mechanical heat pumps consisting of supply air entering supply air intake 22 traveling through Energy Recovery Ventilator (ERV) 20, balancing damper 18, filter 32, cooling coil 34, heating coil 36 and supply air fan 38. The treated air continues via duct 64 for connection with L-Shaped branch duct 14 into the voids 70,72, 74 of the ventilated slab 2 and terminates into open air diffuser 13 mounted on floor outlet 6 or open air diffuser 15 mounted on ceiling outlet 8 as shown on FIG. 1. In slab sensor 68 monitors the thermally charged status of the slabs 2

Return air 114 shown in FIG2 travels back via combined return air duct 64 and 76 with return air 116 return and air mixed air modulating damper 28.

Figure 6:
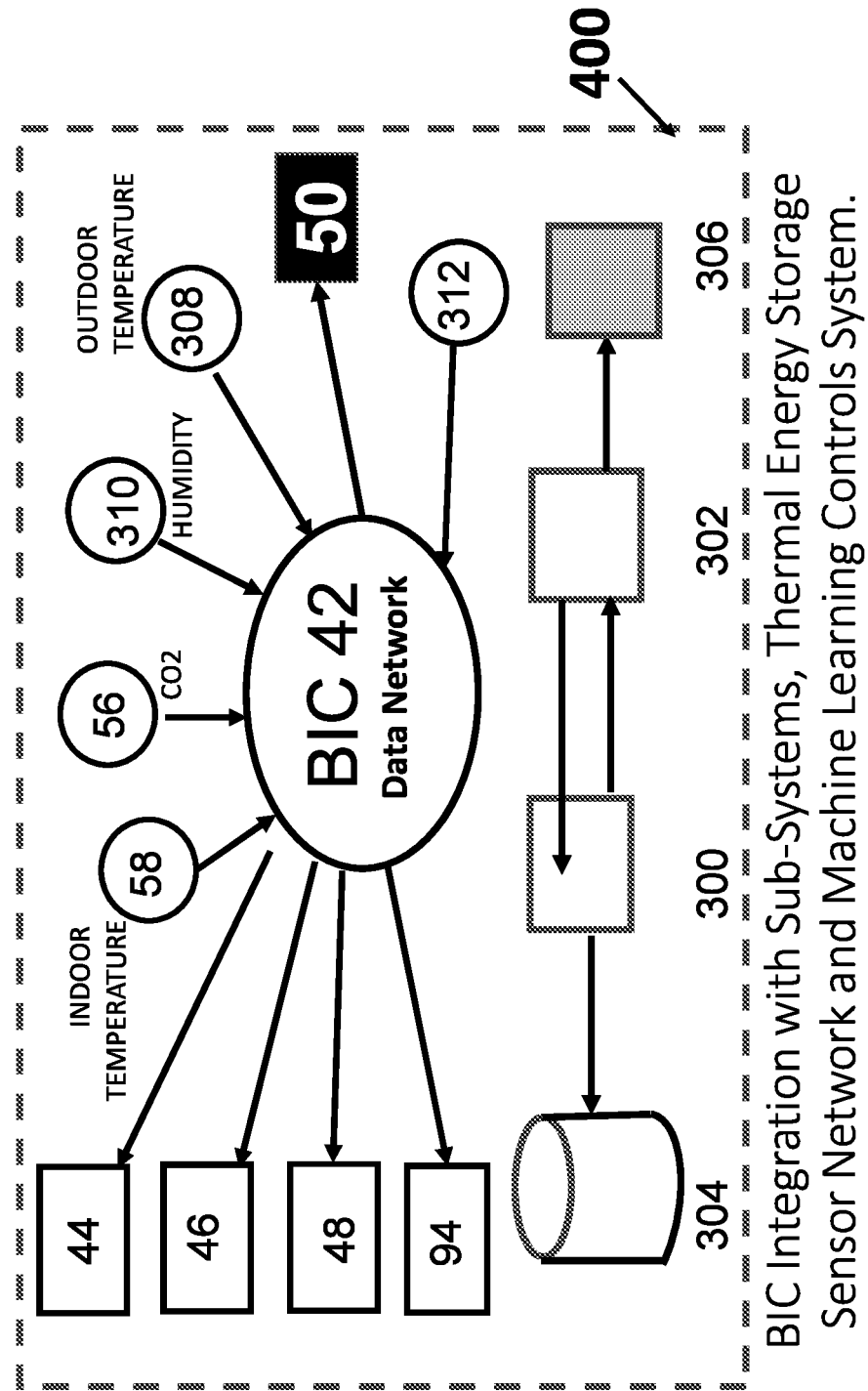
FIG. 6 showed a schematic of a Buildings Intelligent Controls (BIC) Integration with sub-systems, Thermal Energy Storage sensor network and Machine Learning Controls System.

A Building Intelligent Control 42 controls the selected strategy and is shown in FIG. 6 (also see claim 18). The strategy or selection is based on a sequence of selection or restrictions on the possible sources of heating, cooling, humidity and economizer cycles set to harness as much as possible of free thermal energy in any climate zone. The restrictions with each environmental condition and time step algorithm in the building until desired indoor conditions meet actively utilizing buildings thermal dynamics capabilities without comfort compromise employing high potential for peak power reduction when demand on energy grid is high. Effective indoor climate control can be achieved by prompting compensations with advanced smoothing using motorized dampers as shown on FIG. 2, plank 205B and air loop 74 repeatedly as required in the building.

Forecasting can also be achieved through the use of BIC 42 shown in FIG. 3 and FIG. 6 and require considerably lower cooling or heating capacity than systems of the prior art. Such Grid Enabled Buildings (GEB's) using off-peak charge cycles of floor slabs 2 (night time) and are set to avoid day time peak periods until necessary.

In addition to the building benefits this invention provides, advantages are also achieved in optimizing energy transmission and distribution (T&D) resources as this invention expands electrical power stations capacity to serve 10 to 15% more without costly infrastructure build up when superblocks are constructed with grid enabled buildings (GEB's) capabilities.

The Building Intelligent Controls (BIC) shown on FIG. 3 as item 42 and expanded on FIG. 6 as comprehensive system 400 are connected to various sub-systems (black box).

BIC 42 controls shown on FIG. 3 and FIG. 6 can be selectively set for year-round use of indoor building climate comfort systems in various climate zones. It is shown in FIG. 3 as item 400 and expanded in FIG. 6 by itemizing them as intelligent façade 46, micro-grids 48 for seamless tie-in with Smart City energy grid capability 50 at any time the Cities Smart Grid is ready for digital on/off interface of the BIC 42.

These BIC 42 system uses a limited number of sensors (inputs), to adjust the devices or outdoor and indoor climate variances to a selected desired end result. Ideally, this allows the building to perform simple functions without the need for a human intervention for most of the year.

The slabs 2 capabilities of Thermal Energy Storage (TES) with the help of BIC 42 shown in FIG. 3 and FIG. 6 connected with Smart City 50 and Machine learning capability of BIC 42 with GEB building Internet of things (IoT} capability supervises via BIC 42 controls to inject more modern building and energy grid management intelligence and flexibility added into the mix. Machine learning capability by leveraging its algorithms helps to advance building performance optimization regardless if usage patterns are constant or evolving. It is assisting Building operators (humans tasked perhaps to adjust the heuristic/rule settings) to avoid human errors in perception, or attention, when tasked to be constantly evaluating and identifying all the opportunities that exist 24/7/365 to make buildings run better.

This invention is well suited for Machine Learning which takes the variety of control points and merges them into one complex system metric (based on the values), and this metric can learn based on actual metrics with preventive actions or alerts.

One BIC 42 portal can manage a variety of applications as needed now or variable future changes in occupancy.

The power of GEB's controls 42 solution allows building managers to be less concerned about the product protocol and more focused on the goal (values) the building is trying to achieve.

BIC 42 management of outdoor, indoor or in-ground thermal energy extraction from sewers 94 energy exchange are subject to variance (e.g., due to local climate in various climate zones and effects on stand alone buildings facing the East-West-North-South structures or internal area issues.) Recognizing these variables leads to optimization of indoor heating/cooling comfort opportunities and smarter use of energy by avoiding peak power use periods experienced by energy grid when demand for energy by many is evident.

The concrete slab cooling capacity as described herein acting as a virtual thermal storage plant is dynamic and is set to eliminate the need for increased daily cooling or heating traditional systems without thermal storage.

Cooling capacity of the slab 2 when charged is a floating interaction of a great number of factors managed by BIC 42 shown on FIG. 3 and FIG. 6. These factors relate not only to the room configuration but also to supply air conditions and quantity, imposed loads from computers, lights, accidental solar gains and variable outdoor temperatures during unoccupied and occupied periods. Re-chargeable thermally active slabs 2 shown in FIG. 1 should not be compared to conventional systems (that mechanically inject energy into the system) in a binary On or Off mode.

Thermal Energy Storage (TES) algorithms driven by BIC 42 recognize that the thermal storage capacity of the concrete floor cannot convert to the cooling capacity required for the plant (chiller). The cooling capacity produced by the chiller is not the same amount of energy as the cooling capacity needed for comfort in a dynamically controlled mode by BIC 42 interplay with indoor and outdoor conditions in real time.

Dynamic internal heat gains (by people, lights, equipment, accidental summer/winter sun, etc.) interplay with indoor and outdoor conditions, e.g., day time absorption of heat actively stored via ventilation system 64 by entering into the concrete floors 2. Excess day time thermal energy is usually taken away later, during lower intensity periods of unoccupied hours.

The cooling capacity of concrete floors (which as described herein are constantly adjustable by BIC 42 shown on FIG. 3 and FIG. 6) is a direct influence of several key factors but not limited to:

The amount of the surface exposed.
The mass of the slab
Outdoor Humidity
Heat conductivity of the material in the slab (concrete).
Variety of hard or soft floor finishes.
The temperature difference between the slab and the room
Dynamic interaction of outdoor and indoor conditions in particular climate zone.

Air Handling Unit (AHU)

Air Handling Units (AHU) shown in block diagram 84 of FIG. 4 are used for main air delivery carried by main air supply ducts linked with the slabs 2 for delivering a portion of the air from the air plenum 3 into respective floor space follow the sequence as described in FIG. 3. The only difference is the type of heating or cooling system.

The invention describes a method of conditioning air through a floor medium 2 that supports a flexible number of heating cooling systems to support present use and future space configurations.

It simply illustrates a different and yet generic AHU system backed by heating and cooling sources intended for the building.

FIG. 5 illustrates an example of the connection of the ductwork to the modified hollow core slab 2. Hollow core slab 2 complete with concrete toping 78 takes place via L-shaped branch duct 14. Branch duct 14 connected on one end to main insulated duct 64 and on the other end to opening 16 in hollow core slab 2. L-shaped connection 14 has a number of separate parts like air balancing damper 54, T-type connection 220 complete with clean out 226, intermediate part 222 and custom push-fit connection 224 with opening in hollow core slab and special seal 116 to hermetically seal the metal to concrete connection. Main duct 64 and L-shape branch duct connection supported by aircraft wire 76 securely attached to the bottom of hollow core slab 2.

BIC 42 System Integration with Sub-Systems,Thermal Energy Storage

FIG. 6 generally illustrates the sensor network and machine learning controls system BIC 42 main interconnected capabilities.

The BIC 42 controls systems works together with the hollow core concrete slab 2 described herein and air handling unit or Thermal Charge Condition described above for harnessing free energy from exterior assets to recalibrate need for supplementary heating or cooling. In one embodiment supply air Variable Set-point temperature to each building zone shall be continuously re-calculated on a floating basis, such that adjustments to the supply air temperature differential between the thermal slab, Exhaust Air Temperature and Set-point, initially set by user or building operator, and the actual average extract air temperature (as measured before the recirculation loop) can be made. In case of dX system the cooling will be triggered when return or average zone (or the highest) temperature requires compensation in maintaining desired comfort setting. Supply Air Temperature Adjustment shall be=T.E.S. using variable compensation algorithm FACTOR for the building in respective climate zone and time of the year.

A Network of "Internet of Things" (IoT) throughout the building can be set to collect time series data on its current indoor and outdoor Thermal characteristics managed by BIC 42.

Furthermore, exterior thermal characteristics outdoor temperature 308, humidity 310, of the building exterior 312 set to monitor breach of building envelope and excessive loss of heat or cooling via BIC 42 system. See FIG. 3.

BIC 42 uses data collected by the IoT Network (Static and Mobile), augmented by external data sources for Metrological Service for outdoor temperature 308 (Weather Reports) and Prediction of the Energy Flows in the building control hub module 300 can be made versus software simulated and developed over a specified time horizon to suit the building operational needs. This Machine Learning system hub module 300 capability of using Data Analytics in real time facilitates the Projected Simulation comparison with Actual Thermal data of the "as is" now building performance. And, thus determine potential anomalies and learn what actions are necessary, with the facility of the buildings built in TES, to make optimal adjustments or interventions to efficiently manage the energy as well as indoor thermal comfort to specified goals or user preferences. Interventions would be made by human operators based on Machine learning system discovered differences via Application Program Interfaces (API) 300 sending data to 302 module and 302 sends instructions or commands to the building BIC 42 controls mentioned above. See FIG. 3 and FIG. 6.

Machine learning capability transforms real-time data of 300 and 302 into information that directs specific changes to BIC 42 operations.

BIC 42 capabilities can range from sub-system connections shown in FIG. 3 and FIG. 6 as 44,46,48,94 displayed on dashboards and automated trouble or alert levels of urgency to fully integrated automated HVAC, lighting control and security solutions.

However, the BIC 42 shown on FIG. 6 energy uses optimization process focused on Human's key needs for indoor thermal comfort and ventilation safety compared to conventional Buildings controlled the same way whether people are present or not. They follow the Legacy/Rules of Static Programs as pre-determined by their programmers to a certain point until advanced capabilities of BIC 42 take it over. Conventional Building controllers operate based on arbitrary synthetic temperature numbers without human comfort considerations that may differ considerably. They operate in binary (on/off) mode and act on inputs (complains) from people.

BIC 42 Machine learning capability adds a critical piece: Interactive data feedback loop from outdoor 308, indoor 58 and humans in real time can change the pre-determined rules for optimization to a set of values the system seeks to satisfy (e.g., comfort, energy bill reduction, sustainability goals, etc).

BIC 42 supports buildings priorities using Machine learning capability (i.e. the values mentioned above) instead of following rigid conventional programming (i.e. keeping the space at 20 Deg. C. or 72 degrees F.). Machine learning capability enables autonomous improvements to operations within a BIC 42 facility including demand peak power management on 24/7 cycle for heating, cooling, ventilation safety and lighting.

Machine learning capability transforms real-time data 300 into information 302 that directs specific changes to operations by BIC 42. Local and global low carbon and "Smart" city connection 50 impact occurs on several levels.

Deep-energy-daily-cycling (four or more hours) for demand peak load management is built in.

Load shifting, energy use optimization, renewable integration of items 44, 46, 48 and 94 with BIC 42 virtually expand further the capacity of the Smart City 50 connection to energy networks capacity to serve more energy users without build-up of new infrastructure.

This invention by using hollow core slab ventilated structures thermally charges by running free cooling at night, warm or cold air through the hollow cores loop 6 with cross overs 60 and 62 to set their thermal mass at a temperature 58 capable of radiating or absorbing thermal energy to and from the occupied space. In addition, the air running air through the slab void 6 is released into the space through open air diffuser to further support thermal energy and ventilation or more in cooling or heating on demand mode of operation. The majority of these systems are applied with the active hollow core 2 located above the occupancy at the ceiling. At the ceiling and in the cooling mode the slab provides a cold radiant effect to the space below as well as absorbing thermal energy build up from the space through convection between room air and the hollow core slab 2. Such systems have natural thermal mass inertia and thermal storage/absorption capabilities that are set for active management of thermal properties.

EXAMPLE

This invention by using hollow core slab 2 ventilated structures thermally charges by running free cooling at night, warm or cold air through the hollow cores loop 6 with cross overs 60 and 62 to set their thermal mass at a temperature 58 capable of radiating or absorbing thermal energy to and from the occupied space. In addition, the air running air through the slab void 6 is released into the space through open air diffuser to further support thermal energy and ventilation or more in cooling or heating on demand mode of operation. The majority of these systems are applied with the active hollow core 2 located above the occupancy at the ceiling. At the ceiling and in the cooling mode the slab provides a cold radiant effect to the space below as well as absorbing thermal energy build up from the space through convection between room air and the hollow core slab 2. Such systems have natural thermal mass inertia and thermal storage/absorption capabilities that are set for active management of thermal properties.

Furthermore, it is known that the single purpose hollow core floors 2 as described herein along with intelligent controls set to deliver more than manufacturers usually offer for space comfort. Such combination allows the hollow core slab 2 to release the supply air, heating or cooling carried through its core air plenum into the space top down or bottom up without additional materials or products.

A year-round thermal energy exchange in both heating or cooling and ventilation system integrated with modified slab 2 shown in FIG. 1 eliminates the need for ice storage used in the summer by others as well as avoiding add on large storage tanks with heated water.

The USA, and many other countries globally time of the day energy rate structure typically varies from 49% to 60% discount during off peak hours (night time) compared to day time use. Conventional buildings, as a rule, do not have thermal energy storage to take advantage of night time discount energy compared to TES structures.

Peripheral thermal energy storage is required with growing electrification of energy grid eliminated by activating mostly dormant concrete into active TES. It uses HCS concrete floors 2 (or other similar substitutes) paired with BIC 42 linked to IoT technology that unlocks data; data unlocks information; information unlocks for actionable intelligence; and actionable intelligence unlocks untapped energy efficiency beginning from the building all the way to original source of energy via BIC 42. Such new efficiencies support growth of low carbon buildings. Utilization of Off-peak energy to leverage cool/hot air (by efficient thermal storage placed exactly where needed as efficient means to consume it.

Conventional thermal energy storage systems rely on static (heuristic/rule based) programming, and typically are rarely adjusted or optimized after installation. These controllers are programmed to accomplish tasks such as the opening/closing a heating or cooling valve based on a pre-determined schedule.

A year-round thermal energy exchange in both heating or cooling and ventilation system integrated with the modified slab 2 shown in FIG. 1 eliminates the need for ice storage used in the summer by others as well as avoiding add on large storage tanks with heated water.

This invention also describes a method having a modified slab 2 that can be cast in place concrete or hollow core concrete floor; providing an air passage labyrinth 3 inside of the floor with an inlet and open air outlet for receiving air and permitting interactive thermal radiant energy exchange combined with ventilation; said ceiling or air plenum communicating with said outlet so as to receive air from said air passage through said modified slab 2; and adjustable Air Handling Units (AHU) shown in FIG. 4 main air delivery ducted means carried by main air supply ducts linked with modified slab 2 as shown in FIG. 1 for delivering a portion of the air from said air plenum into respective floor space.

The method of conditioning air through a modified slab or medium 2 supports flexible future space use and future space configurations.

Cast in place concrete floors or Pre-cast Concrete Floors, constructed as Hollow core slab 2, form the thermal energy feature of TES, for successful year-round integration with indoor building climate comfort systems, aided by intelligent façade 46, heat extraction from sewers 94 or microgrids 48 ready for seamless tie-in with Smart City energy grid 50. grid Enabled Buildings (GEB) is highly efficient operating in standalone mode, however other sources of free energy from intelligent façade 46 or heat extraction from sewers 94 that normally have +35 Deg. C. or 95 F would be a natural consideration due to no cost/low cost of adding to operational efficiency while contributing to growing low carbon living trends.

Continuous Re-commissioning FEATURE: Continuous Re-commissioning 312 of building envelope shown in FIG. 6. The power of GEB's controls solution enabled by BIC 42 daily digital building envelope allows to identify\building envelope breaches. Structures Continuous Re-commissioning and Re-calibration of monitored building envelope Thermal Characteristics are not neglected longer than necessary. E.g., Breach of Building Envelopes, such as micro-cracks/leaks to walls and ceilings—perhaps not visible to the naked eye. These occur with wear and tear as structures age, but also due to special events, e.g., severe storms, earthquakes, accidents, etc.) For such ad hoc or scheduled investigations, we have designed technology to effectively address the issue—integrating into the system as previously described. See FIG. 6 item 312.

The output from the system described herein—being recommendations/itemized guide for necessary corrective maintenance. This output is delivered to the GEB's Control System 42 algorithm to minimize, mitigate the problem, plus delivering a report to repair/rectify specific components.

In another embodiment the grid enabled building (GEB) is set to virtually expand Micro-Grids manufacturers specified capacity by facilitating energy demand load management by means of GEB leveraging stored thermal energy in a form of cooling or heat. In another embodiment the grid enabled building (GEB) set to reduce the need for typically larger specified HVAC heating/cooling capacity determined by custom software developed herein and validated by actual utility metering (energy consumption bills) vs predicted as well as independent validations.

The grid enabled building (GEB) can be set to control vertical temperature rise in multi-story buildings by means of individual HVAC units 82 located on each floor.

The grid enabled building (GEB) using historically passive concrete as a smart asset as described herein is set to virtually expand Micro-Grids manufacturers specified capacity from 10% to 25% by facilitating demand load management by means of the GEB's BIC 42 FIG. 3 and FIG. 6.

The grid enabled buildings as described herein exhibit reduction in embodied carbon during new construction or retrofits with hollow core flooring resulting from deletion of:
a) peripheral ice storage,
b) thermal heat storage,
c) in-floor radiant wet heating system with piping tubing, plumbing, pumps and complex controls.
d) in-floor radiant wet cooling system with piping tubing, plumbing, pumps and complex controls.

Also the grid enabled buildings as described herein exhibit reduction in operational carbon during the life of the building resulting from deletion of:
e) peripheral ice storage,
f) thermal heat storage,
g) in-floor radiant wet heating system with piping tubing, plumbing, pumps and complex controls.
h) in-floor radiant wet cooling system with piping tubing, plumbing, pumps and complex controls.

All of the described items result from simplifications achievable with the invention described herein.

The grid enabled building reduces the need for specified HVAC or Geothermal heating/cooling capacity as modeled herein compared to prior art software.

The above-described Continuous building envelope Re-commissioning 312 via Machine learning system is depicted in FIG. 6 as an important item overlooked in conventional buildings. The continuous commissioning of building envelope in thermally charged building reduces loss of energy and cuts down on carbon, while continuously monitoring the following parameters:
Supply air temperature
Return air temperature
Supply air setpoint
outside air-dry bulb
outside air wet bulb The grid enabled buildings as described herein have built in capability for new low carbon buildings and reduction in growing operational expenses. Electrical Grid-interactive efficient buildings with built-in year-round buildings thermal storage capabilities are set to harness low grade free energy when available plus modify volume and time of energy use, integrate onsite more compact energy generation that is monitored and managed via smart controls, to become a resilient Smart City asset supporting more reliable energy grid by acting in sync with changing needs. It is addressing immediate needs for low carbon buildings today, namely:
High-Performance/Low-Carbon Building without new HVAC Technologies/Solutions
Optimization of onsite Energy Generation to facilitate building daily needs with help of Thermal Storage by activating largely dormant building structures thermal capabilities.
Improved Year-Round Indoor Ventilation Safety (eg pollutants, off gasses from new furniture)
Reduction of embodied and operational carbon
Energy grid enabled buildings are Smart City ready. Connection with Smart City built in and activation available immediately by enabling digital switch within the building's controls.

The invention claimed is:

1. A thermal energy exchange and ventilated hollow core medium system comprising:
(a) said hollow core medium having an air passage therethrough with an inlet and outlet communicating with said air passage;
(b) an air handler unit comprising:
(i) adjustable heating/cooling means; and
(ii) ventilation means;
connected to said hollow core medium to deliver air from said outlet of said hollow core medium to a space exterior to said hollow core medium; and
(c) an air duct having a T junction disposed between said inlet and said air handling unit, and said T junction having a clean out port;
(d) sensors for measuring sources of thermal energy from overhead lighting, movement of people in a space, humidity, and thermal energy exchange between airflow and said hollow core medium;
(e) a control for setting comfort settings and for receiving signals from said sensors to control said air handler unit to activate said thermal energy exchange between said airflow and said hollow core medium and achieve said comfort settings.

2. The thermal energy exchange and ventilated hollow core medium system as claimed in claim 1 wherein:
(a) said hollow core medium comprises a hollow core concrete slab of a floor or ceiling,
(b) said air passage comprises
(i) a plurality of voids connected together to define an air passage labyrinth presenting said inlet and said outlet;
(c) said outlet comprises a floor mounted diffuser or a ceiling mounted diffuser;

(d) said air handler unit comprises a fan for blowing air through said air passage labyrinth for relative thermal exchange between said air and said hollow core concrete slab;

(e) said air is delivered through said floor mounted diffuser to a space above said hollow core concrete slab;

(f) said air handler unit comprises adjustable heating and cooling means for delivering said air through said inlet, said labyrinth and said outlet to a space above said hollow core concrete slab; and (g) return damper means for directing said air into said space from said ceiling or floor.

3. The thermal energy exchange and ventilated hollow core concrete slab as claimed in claim 2 including thermostat means and rapid boost motorized damper and balancing dampers to optionally select one of said multiple voids so as to shorten said labyrinth passage for rapid temperature adjustment to said space.

4. The thermal energy exchange and ventilated hollow core concrete slab as claimed in claim 2 disposed in both a ceiling and floor of a building so as to define a space therebetween; including an adjustable comfort setting unit for one room or one floor zone in said building.

5. The thermal energy exchange and ventilated hollow core medium system as claimed in claim 4 including:

(a) an upper opening on one end of said hollow core concrete slab for receiving a portion of air in said space; and (b) an opening in at another end of said hollow core concrete section for delivering said air in said space.

6. The thermal energy exchange and ventilated hollow core medium system as claimed in claim 5 wherein: said sensors collect time series data on indoor and outdoor thermal characteristics of a building.

7. The thermal energy exchange and ventilated hollow core medium system as claimed in claim 6 wherein said T-shaped junction is hermetically sealed to said inlet of said hollow core concrete slab.

8. A grid enabled building comprising:

(a) hollow core concrete slab disposed in a ceiling and floor of the building to define a space therebetween; said hollow core concrete slab extending longitudinally from one end of said hollow core concrete slab to another end and presenting a plurality of substantially parallel hollow cores extending inside said hollow core concrete section from said one end to said other end; wherein some of the said substantially hollow cores are plugged at said ends and bridged to present a labyrinth passage having an inlet and outlet;

(b) an air handler unit comprising:
 (i) adjustable heating/cooling means; and
 (ii) ventilation means;
connected to said hollow core concrete slab to deliver air from said outlet to said space;

(c) indoor sensors for measuring sources of thermal energy available from overhead lighting, movement of people in the space, indoor humidity, and said thermal energy exchange between said air flow and said hollow core concrete slab;

(d) outdoor sensors for measuring sources of thermal energy available outdoors during unoccupied and occupied periods;

(e) a building control for comfort setting for receiving signals from said indoor and outdoor sensors to control said air handler unit to activate said thermal energy exchange between said airflow and said hollow core medium and achieve said comfort setting;

and active said air handler unit to meet set comfort setting.

9. The grid enabled building as claimed in claim 8 wherein said building control is capable of being activated to collect and store thermal energy in said hollow core concrete slab when in a heating mode for delayed discharge on demand when needed.

10. The grid enabled building as claimed in claim 8 wherein said building control means includes a control capable of being activated to collect and store thermal energy in said hollow core concrete slab when in a cooling mode for delayed discharge on demand when needed.

11. The grid enabled building as claimed in claim 8 wherein said building control means controls vertical temperature rise in a multi-story building by individual HVAC units located on each floor of a building.

12. The grid enabled building as claimed in claim 11 wherein said building control means is operable to identify via controls logic a breach of building envelope in thermally charged building to take remedial action and maintain said desired space comfort.

13. The grid enabled building as claimed in claim 8 wherein said grid enabled building is connected to underground sewer lines and said building control is set to collect and store thermal energy in cooling modes when available for delayed discharge on demand when needed.

14. The grid enabled building as claimed in claim 13 wherein said building control is set to collect and store within said hollow core concrete section thermal heat energy from said underground sewer lines and store it within said building.

15. The grid enabled building as claimed in claim 14 in multi-buildings set to interact between the multi-buildings to control indoor radiant comfort using air only.

16. The grid enabled building as claimed in claim 8 wherein said building control is operable based on a sequence of restrictions on said sources of thermal energy, humidity, and for various heating cooling zones globally; wherein the restrictions are sequenced with each time step in the building until desired indoor conditions are met by actively utilizing said sources of thermal energy.

17. The grid enabled building as claimed in claim 8 wherein said building control is integrated with said hollow core concrete slab to store thermal energy for harnessing free energy from said available thermal energy to recalibrate need for supplementary heating or cooling; wherein a supply air variable set-point temperature to each building zone is continuously re-calculated, such that adjustments to the supply air temperature differential between the hollow concrete section, exhaust air temperature and set-point initially set by user or building operator, and the actual average air temperature from said outlet, as measured by said sensors before the recirculation loop; wherein in case of direct expansion cooling system cooling will be triggered when return or average zone or the highest temperature requires compensation to maintaining the desired comfort setting; and wherein supply air temperature adjustment shall be equal to thermal energy storage using a variable compensation algorithm for the building in a respective climate zone and time of the year.

18. The grid enabled building as claimed in claim 17 wherein the supply air variable set point temperature is machine learnable and is re-calibrated based on comparison of simulated versus actually constructed building for the climate zone the building is built; wherein the output from the building control includes recommendations and itemized guide for necessary corrective maintenance.

* * * * *